No. 846,389. PATENTED MAR. 5, 1907.
J. BLACKBURN.
EXTENSION HANDLE FOR AUGERS.
APPLICATION FILED MAY 22, 1906.

ATTEST.
H. J. Fletcher.
M. T. Smith.

INVENTOR
JASPER BLACKBURN.
By Kigdon & Longan
ATTY'S.

THE NORRIS PETERS CO., WASHINGTON, D. C.

UNITED STATES PATENT OFFICE.

JASPER BLACKBURN, OF CHILLICOTHE, MISSOURI.

EXTENSION-HANDLE FOR AUGERS.

No. 846,389.

Specification of Letters Patent.

Patented March 5, 1907.

Application filed May 22, 1906. Serial No. 318,233.

*To all whom it may concern:*

Be it known that I, JASPER BLACKBURN, a citizen of the United States, and a resident of Chillicothe, Missouri, have invented certain new and useful Improvements in Extension-Handles for Augers, of which the following is a specification containing a full, clear, and exact description, reference being had to the accompanying drawings, forming a part hereof.

My invention relates to an extension-handle for augers, and particularly for augers for boring post-holes and the like in the ground.

The object of my invention is to provide an auger for boring holes in the earth with an extension-handle and means whereby the telescoping parts of the handle are rigidly locked together while in use, this enabling the person using the auger to bore holes in the earth to an extra depth.

To the above purposes my invention consists in certain novel features of construction and arrangement of parts, that will be hereinafter more fully set forth and pointed out in the claim and illustrated in the accompanying drawings, in which—

Figure 1:
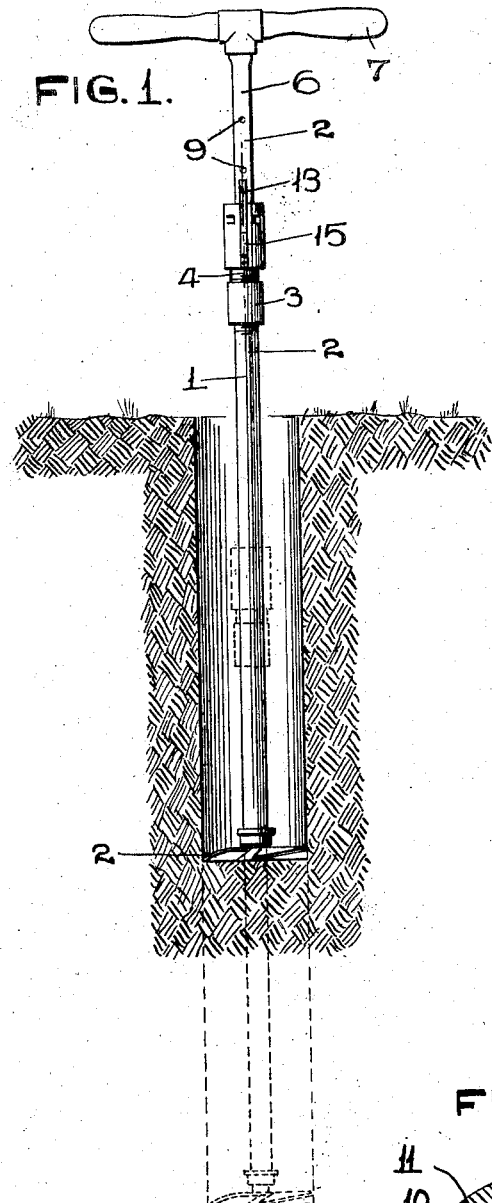
Figure 2:
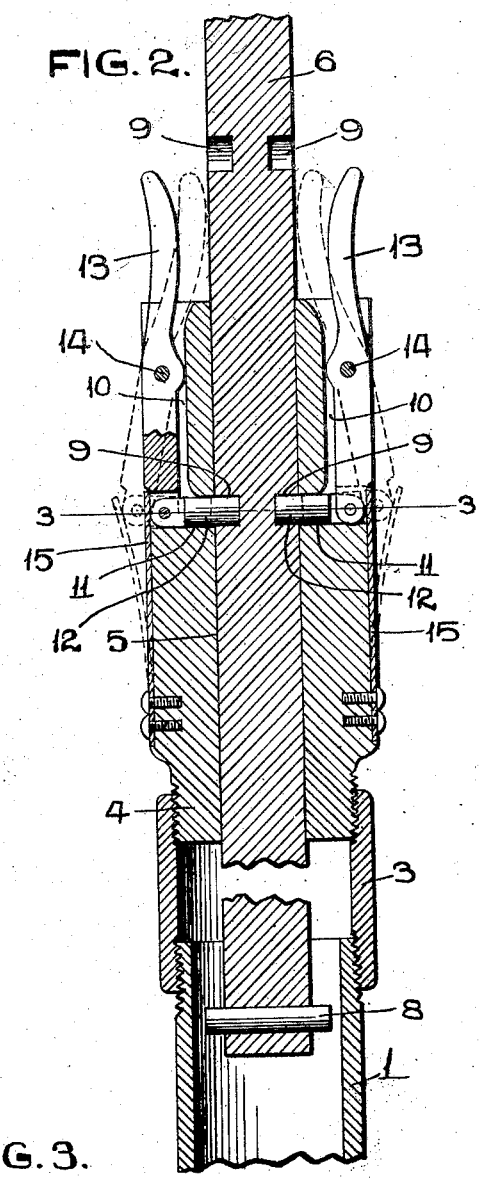
Figure 3:
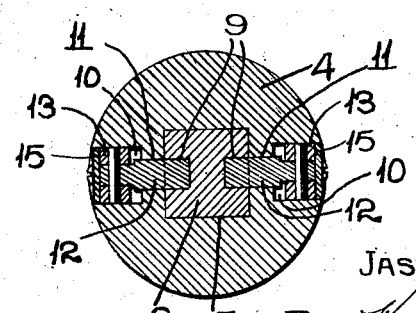

Figure 1 is a side elevation of an auger provided with my improved handle, which auger is shown in operative position in the ground. Fig. 2 is an enlarged vertical section taken on the line 2 2 of Fig. 1. Fig. 3 is a horizontal section taken on the lines 3 3 of Fig. 2.

Referring by numerals to the accompanying drawings, 1 designates the lower portion of the auger-handle, which is preferably of tubular form, such as a piece of gas-pipe of suitable size, and secured to the lower end thereof in any suitable manner are the usual auger-bits 2.

Fixed to the upper end of the tubular portion 1 of the handle is a collar 3, in the upper end of which is fixed a circular block 4, through which is formed a vertically-disposed rectangular opening 5. Arranged to slide through the opening in this block is a rectangular bar 6, which forms the upper portion of the handle, and which bar is arranged to telescope into the tubular portion 1 of the handle. Fixed to the upper end of this bar 6 are the cross-handles 7, and fixed in the lower end of the bar is a rivet or cross-pin 8, the ends of which extend slightly, so as to prevent the upper portion 6 of the handle from being entirely withdrawn from the block 4.

Formed in opposite faces of the bar 6, and preferably at equal distances apart, are the oppositely-arranged pairs of recesses 9.

Formed in the upper portion of the block 4 and on opposite sides thereof are the vertically-arranged recesses 10, and extending from the lower ends of said recesses 10 inwardly and communicating with the rectangular opening 5 through said block 4 are the oppositely-arranged apertures 11. Arranged for horizontal movement through these apertures 11 are pins 12, which are pivotally connected at their outer ends to the lower ends of operating-handles 13, which occupy the recesses 10, which are fulcrumed on pins 14, passing horizontally through the upper portion of the block 4. Leaf-springs 15 are secured at their lower ends in any suitable manner to opposite points on the lower portion of the block 4, the upper free ends of which leaf-springs bear directly upon the lower ends of the handles 13.

The outer faces of the lower ends of the handles 13 are slightly recessed in order that the upper ends of the springs 15 will lie flush with the outer faces of said handles 13, and said springs are also let into the surface of the block 4 to the extent of their thickness. This arrangement prevents dirt from getting beneath said springs to render them inoperative.

The manipulation of an auger-handle of my improved construction is obvious, it only being necessary to manually engage the upper ends of the handles 13 and press the same inwardly, as shown by dotted lines in Fig. 2, and thus withdraw the inner ends of the pins 12 from the recesses 9.

The bar 6 and the tubular member 1 may now be adjusted longitudinally relative one another, and when the pins 12 are reëngaged in a pair of the recesses 9 the two parts of the handle are rigidly locked together.

Thus I have provided a simple, inexpensive, and easily-adjusted auger-handle which is particularly adapted for deep-boring augers.

I claim—

An auger-handle, comprising a tubular member, a block carried by the upper end thereof, through which block is formed a non-circular opening, a solid member arranged to slide through the opening in the block, there being recesses formed in opposite sides of the sliding member, pins carried by the block for engaging in said recesses, handles fulcrumed in the block and pivotally connected at their lower ends to the outer ends of the pins, and leaf-springs carried by the block, the free ends of which bear on the lower ends of the handles; substantially as specified.

In testimony whereof I have signed my name to this specification in presence of two subscribing witnesses.

JASPER BLACKBURN.

Witnesses:
M. P. SMITH,
H. G. FLETCHER.